(12) United States Patent
Arai et al.

(10) Patent No.: US 8,831,945 B2
(45) Date of Patent: Sep. 9, 2014

(54) LANGUAGE MODEL GENERATING DEVICE, METHOD THEREOF, AND RECORDING MEDIUM STORING PROGRAM THEREOF

(75) Inventors: Kazuhiro Arai, Tokyo (JP); Tadashi Emori, Tokyo (JP)

(73) Assignee: NEC Informatec Systems, Ltd., Tokyo (JP)

( * ) Notice: Subject to any disclaimer, the term of this patent is extended or adjusted under 35 U.S.C. 154(b) by 238 days.

(21) Appl. No.: 13/271,424

(22) Filed: Oct. 12, 2011

(65) Prior Publication Data
US 2012/0089397 A1 Apr. 12, 2012

(30) Foreign Application Priority Data
Oct. 12, 2010 (JP) ................................ 2010-229526

(51) Int. Cl.
*G10L 15/00* (2013.01)
*G10L 15/06* (2013.01)
*G10L 15/183* (2013.01)

(52) U.S. Cl.
CPC ............. *G10L 15/063* (2013.01); *G10L 15/183* (2013.01); *Y10S 707/99934* (2013.01)
USPC ............ 704/251; 704/2; 704/3; 704/4; 704/5; 704/8; 707/999.004; 707/705; 707/706; 707/708; 707/709; 707/760; 707/759; 707/769; 707/736; 707/748; 715/256; 715/264

(58) Field of Classification Search
CPC ................... G06F 17/30011; G06F 17/30436; G06F 17/30616; G06F 17/30663; G06F 17/30669; G06F 17/30672; G06F 17/30634; G06F 17/289; G06F 17/2872
USPC .............. 704/2, 3, 4, 5, 8, 251; 707/705, 706, 707/708, 709, 760; 715/256, 264; 382/440, 382/224, 228, 229, 230
See application file for complete search history.

(56) References Cited

U.S. PATENT DOCUMENTS 5,659,766 A * 8/1997 Saund et al. ...................... 704/9
6,006,221 A * 12/1999 Liddy et al. ......................... 1/1
(Continued)

FOREIGN PATENT DOCUMENTS

JP 09-114623 5/1997
JP 10-334101 12/1998
(Continued)

OTHER PUBLICATIONS

JP Office Action dated Aug. 30, 2012 with English translation, Application No. 2010-229526.

(Continued)

*Primary Examiner* — Michael Colucci
(74) *Attorney, Agent, or Firm* — Young & Thompson

(57) ABSTRACT

A text in a corpus including a set of world wide web (web) pages is analyzed. At least one word appropriate for a document type set according to a voice recognition target is extracted based on an analysis result. A word set is generated from the extracted at least one word. A retrieval engine is caused to perform a retrieval process using the generated word set as a retrieval query of the retrieval engine on the Internet, and a link to a web page from the retrieval result is acquired. A language model for voice recognition is generated from the acquired web page.

6 Claims, 7 Drawing Sheets

(56) References Cited

U.S. PATENT DOCUMENTS

| | | | |
|---|---|---|---|
| 6,137,911 | A * | 10/2000 | Zhilyaev ................... 382/225 |
| 6,256,629 | B1 * | 7/2001 | Sproat et al. ................ 1/1 |
| 7,158,961 | B1 * | 1/2007 | Charikar ..................... 1/1 |
| 7,383,258 | B2 * | 6/2008 | Harik et al. .................. 1/1 |
| 8,135,575 | B1 * | 3/2012 | Dean ........................ 704/7 |
| 2008/0243479 | A1 * | 10/2008 | Cafarella et al. .............. 704/9 |
| 2008/0281764 | A1 * | 11/2008 | Baxter ...................... 706/12 |
| 2011/0004462 | A1 * | 1/2011 | Houghton et al. .............. 704/9 |
| 2011/0087669 | A1 * | 4/2011 | Ancin et al. ................ 707/740 |

FOREIGN PATENT DOCUMENTS

| | | |
|---|---|---|
| JP | 2002-140357 | 5/2002 |
| JP | 2002-189734 | 7/2002 |
| JP | 2002-229588 | 8/2002 |
| JP | 2002-259428 | 9/2002 |
| JP | 2005-234688 | 9/2005 |
| JP | 2005-266980 | 9/2005 |
| JP | 2006-004283 | 1/2006 |
| JP | 2007-133688 | 5/2007 |
| JP | 2010-039647 | 2/2010 |

OTHER PUBLICATIONS

Ryo Masumura, Masashi Ito, Akinori Ito and Shozo Makino, "Investigation of Composition of a Search Query for Language Model Adaption using WWW", The Special Interest Group Technical Reports of Information Processing Society of Japan (SIG Technical Report of IPSJ), Speech language information processing (SLP), Jun. 15, 2009, vol. 2009-SLP-76, pp. 1-8.

Ryo Masumura, Masashi Ito, Akinori Ito and Shozo Makino, "Effect of Unsupervised Language Model Adaptation using WWW by Composition of Effective Search Query", Acustical Society of Japan, Reports of the 2009 Autumn Meeting (CD-ROM), Sep. 15, 2009, pp. 51-54.

Ryo Masumura, Masashi Ito, Akinori Ito and Shozo Makino, "Unsupervised Language Model Adaptation based on Topic-related Word Estimation using Web Search Results", Acustical Society of Japan, Reports of the 2010 Spring Meeting (CD-ROM), Mar. 8, 2010, pp. 57-58.

Ito Yusuke, Nishizaki Hiromitsu, Sekiguchi Yoshihiro "Improving recognition performance of spoken documents using similar documents on the Internet", IEIC Technical Report, NLC2005-65, SP2005-98 (Dec. 2005), p. 49-53.

Nishimura Ryuichi, Nagatomo Kentaro, Komatsu Kumiko, Kuroda Yuka, Lee Akinobu, Saruwatari Hiroshi, Shikano Kiyohiro, "Automatic Language Model Building Tool using Web Texts", Speech Language Information Processing 35-8 (Feb. 3, 2001), p. 43-47.

Takahashi Shin-ya, Morimoto Tsuyoshi, and Irie Yuki, "Analysis of Training Corpus Collected by Web Crawling for Speech Recognition of News Documents", Fukuoka University review of technological sciences 77, Sep. 2006, p. 37-44.

JP Office Action dated May 7, 2013, with partial English translation; Application No. 2010-229526.

* cited by examiner

FIG.3

| IT IS FINE TODAY. | |
|---|---|
| NOTATION | PART OF SPEECH |
| IT | PRONOUN |
| IS | VERB |
| FINE | ADJECTIVE |
| TODAY | NOUN |
| | PUNCTUATION MARK |
| IT WILL BE SUNNY TOMORROW AGAIN. | |
| NOTATION | PART OF SPEECH |
| IT | PRONOUN |
| WILL | MODAL VERB |
| BE | VERB |
| SUNNY | ADJECTIVE |
| TOMORROW | NOUN |
| AGAIN | ADVERB |
| | PUNCTUATION MARK |

FIG.4

| WORDING (NOTATION) | |
|---|---|
| BRITISH ENGLISH | AMERICAN ENGLISH |
| COLOUR | COLOR |
| AEROPLANE | AIRPLANE |
| LIFT | ELEVATOR |
| FLYOVER | OVERPASS |
| FITTED | FIT |
| SELECTED MEANING | |
| NOTATION | PART OF SPEECH |
| SEE | VERB |
| SAW | VERB |
| LIVE | VERB, ADJECTIVE |
| SPOKEN LANGUAGE (NOTATION) | |
| RIGHT? | |
| OH,YES | |
| COULD BE | |

FIG.5

| WORD | APPEARANCE FREQUENCY |
|---|---|
| SAME PERIOD | 32 |
| PRECEDING YEAR | 31 |
| DECREASE | 19 |
| BUSINESS | 16 |
| SALES | 16 |
| INCREASE | 15 |
| FIELD | 14 |
| FORECAST | 12 |
| SECURITIES | 10 |
| DESCRIPTION | 9 |
| FUTURE | 8 |
| PROFIT | 7 |
| QUATER | 7 |
| SERVICE | 7 |

FIG.6

| WORD SET | BUSINESS PERFORMANCE, PRECEDING YEAR, SAME PERIOD, FIELD, SALES |
|---|---|

FIG.8

| FIRST WORD SET | BUSINESS PERFORMANCE, PRECEDING YEAR, SERVICE |
|---|---|
| SECOND WORD SET | FIELD, BUSINESS PERFORMANCE, SALES |
| THIRD WORD SET | QUARTER, SALES, BUSINESS PERFORMANCE |
| FOUR WORD SET | SERVICE, SALES, BUSINESS PERFORMANCE |
| FIVE WORD SET | BUSINESS PERFORMANCE, SERVICE, INVESTMENT |

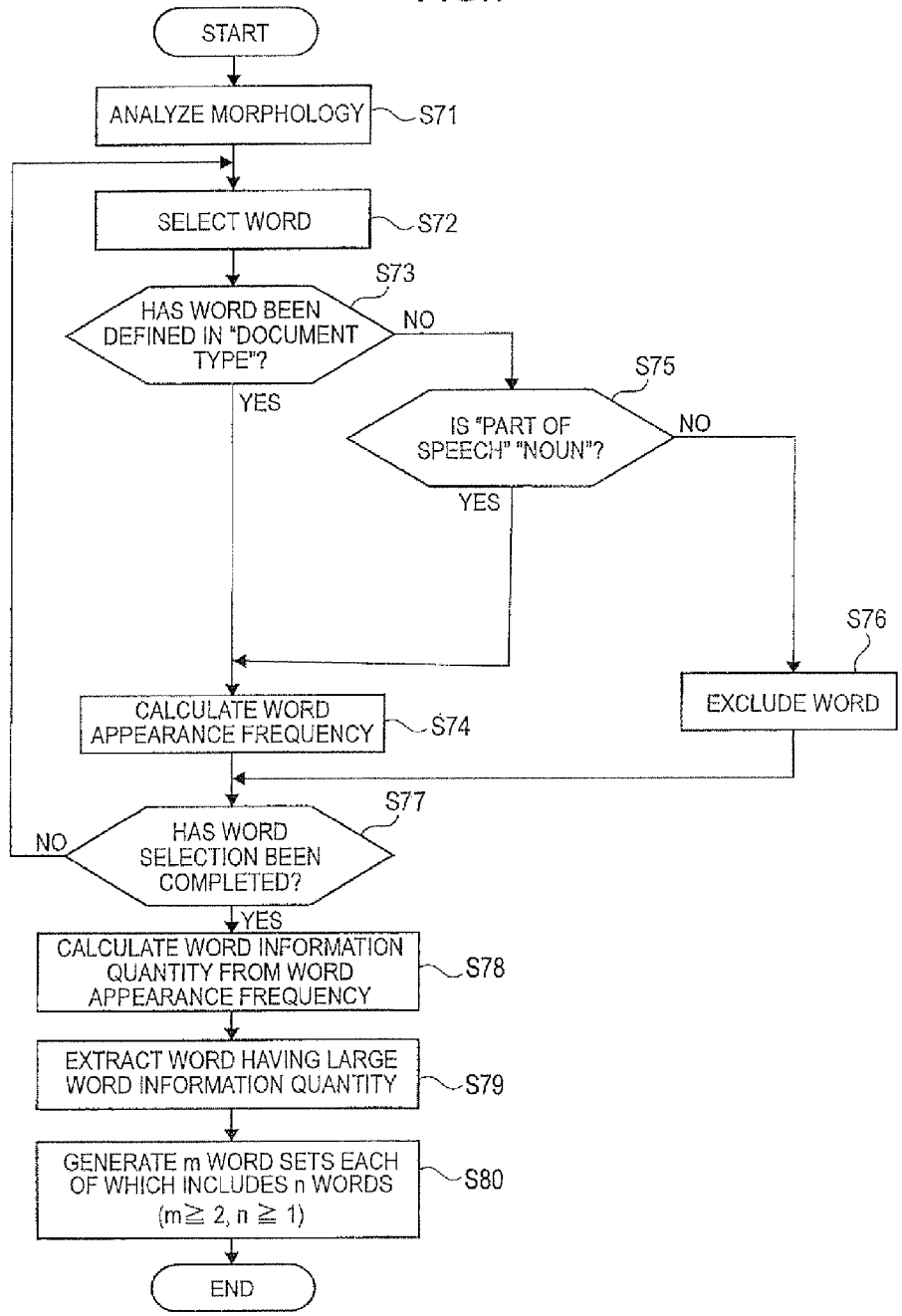

LANGUAGE MODEL GENERATING DEVICE, METHOD THEREOF, AND RECORDING MEDIUM STORING PROGRAM THEREOF

This application is based upon and claims the benefit of priority from Japanese patent application No. 2010-229526, filed on Oct. 12, 2010, the disclosure of which is incorporated herein in its entirety by reference.

TECHNICAL FIELD

The present invention relates to a language model generating device, a method thereof, and a recording medium storing a program thereof, and more particularly to a language model generating device, a method thereof, and a recording medium storing a program thereof that efficiently collect a corpus similar to the content of a voice recognition target from web pages present on the Internet and generate a language model.

BACKGROUND ART

As a method of complementing word information of a voice recognition target when a language model for voice recognition is generated, there is a method of collecting information similar to the content of the target from web pages on the Internet and generating a language model.

Generally, when the retrieval is performed by a retrieval system that retrieves a world wide web (WWW) based on a designated retrieval word, links of web pages which are arranged according to rank, decided by a predetermined evaluation criterion, are output on a page obtained as a retrieval result. Examples of an evaluation index include; appearance frequency of the retrieval word, metadata of a hypertext markup language (HTML), the number of page links, the presence and absence of a link from a page having many user references, and the like. In order to generate the language model, a web page of a link destination linked from the retrieval result page is acquired. However, as the web page of the link destination, web pages including the content similar to a voice recognition target may be provided, but in most cases, web pages including a plurality of topics or mentioning specialized fields are provided. Thus, if the language model is generated without selecting the web page to acquire, the degree of recognition accuracy of voice recognition is lowered.

For this reason, various techniques for selecting the web page and extracting words involved in selection of the web page have been suggested.

For example, Non-Patent Literature 1 discloses a technique for extracting a word whose part-of-speech information represents a noun from a word string as a result of voice recognition, retrieving a news site on the internet using the extracted word as a retrieval word, and collecting similar web pages. In a technique disclosed in Non-Patent Literature 2, in order to collect a medical related corpus, only the word "medical" is used as the retrieval word, and information is collected up to below two layers of the link destination of the retrieval result. In a technique disclosed in Non-Patent Literature 3, words whose appearance frequencies in the recognition result are ranked within top five are extracted as the retrieval words.

Further, Patent Literature 1 discloses a technique of preventing a concatenation of words including a word with a high appearance frequency from having an unreasonably high language probability when the language model is generated. Patent Literature 2 discloses a technique of changing retrieval priority according to the background color of a character string inside an image in a system of retrieving information on a network using the character string. In a user interface design tool capable of designing voice recognition, a voice rule synthesis, or the like disclosed in Patent Literature 3, a designer can set a character recognition part and set a recognition mode to "hiragana" or the like.

CITATION LIST

Patent Literature

{PTL 1} JP-A-2002-229588 (paragraph {0103})
{PTL 2} JP-A-2010-039647 (paragraph {0044})
{PTL 3} JP-A-09-114623 (paragraph {0107} and FIG. 13)

Non-Patent Literature

{NPTL 1} Ito Yusuke, Nishizaki Hiromitsu, Sekiguchi Yoshihiro "Improving recognition performance of spoken documents using similar documents on the Internet", IEIC Technical Report, NLC2005-65, SP2005-98 (2005-12), p. 49-53
{NPTL 2} Nishimura Ryuichi, Nagatomo Kentaro, Komatsu Kumiko, Kuroda Yuka, Lee Akinobu, Saruwatari Hiroshi, Shikano Kiyohiro, "Automatic Language Model Building Tool using Web Texts", Speech Language Information Processing 35-8 (2001.2.3), p. 43-47
{NPTL 3} Takahashi Shin-ya, Morimoto Tsuyoshi, and Inci Yuki, "Analysis of Training Corpus Collected by Web Crawling for Speech Recognition of News Documents", Fukuoka University review of technological sciences 77, September, 2006, p. 37-44

SUMMARY OF INVENTION

Technical Problem

However, in the technique disclosed in Non-Patent Literature 1, a wide variety of web pages including a word having a plurality of meanings may possibly be retrieved even though the part of speech is narrowed down to a noun. For this reason, when web pages are used as a learning corpus of the language model of voice recognition, the degree of recognition accuracy may be lowered. Further, even though information of top two layers of the retrieval result is collected using the technique of Non-Patent Literature 2, since information of the web pages of the two layer destinations does not necessarily include the desired web page, the degree of recognition accuracy may be lowered. In Non-Patent Literature 3, frequently-appearing words within top five ranks are used as the retrieval words. However, high frequency words may be words that frequently appear in all documents. Thus, when these words are used as the retrieval words, it is difficult to obtain the desired retrieval result. Further, since a synonym may be included due to paraphrasing of a word or fluctuation of notation, the retrieval result may be biased, and it is difficult to collect a sufficient amount of corpuses for desired information from the link destinations of the retrieval result.

Further, Patent Literature 1 does not disclose the technique of reliably selecting a feature word representing a feature of a sentence at the time of word extraction. Patent Literature 2 does not disclose the technique of giving a priority applied at the time of generating the language model into a character string. In Patent Literature 3, the type of character such as Hiragana or a Chinese character is recognized, but it is difficult to recognize text according to the content of voice recognition target.

Thus, an exemplary object of the present invention is directed to provide a language model generating device, a method thereof, and a program thereof that efficiently collect a corpus similar to the content of the voice recognition target from the web pages present on the Internet and generate a language model.

Solution to Problem

According to an exemplary first aspect of the present invention, there is provided a language model generating device, which includes:
a corpus analyzer which analyzes text in a corpus including a set of world wide web (web) pages;
an extractor which extracts at least one word appropriate for a document type set according to a voice recognition target based on an analysis result by the corpus analyzer;
a word set generator which generates a word set from the at least one word extracted by the extractor;
a web page acquiring device which causes a retrieval engine to perform a retrieval process using the word set generated by the word set generator as a retrieval query of the retrieval engine on the Internet and acquires a web page related to the word set from the retrieval result; and
a language model generating device which generates a language model for voice recognition from the web page.
According to an exemplary second aspect of the present invention, there is provided a language model generating method, which includes the steps of:
analyzing a text in a corpus including a set of world wide web (web)) pages;
extracting at least one word appropriate for a document type set according to a voice recognition target based on an analysis result;
generating a word set from at least one extracted word;
causing a retrieval engine to perform a retrieval process using the generated word set as a retrieval query of the retrieval engine on the Internet and acquiring a web page related to the word set from the retrieval result; and
generating a language model for voice recognition from the acquired web page.
According to an exemplary third aspect of the present invention, there is provided a non-transitory computer-readable recording medium storing a language model generating program used in a computer of a language model generating device and causing the computer to execute:
a step of analyzing a text in a corpus including a set of world wide web (web) pages;
a step of extracting at least one word appropriate for a document type set according to a voice recognition target based on an analysis result;
a step of generating a word set from at least one extracted word;
a step of causing a retrieval engine to perform a retrieval process using the generated word set as a retrieval query of the retrieval engine on the Internet and acquiring a web page related to the word set from the retrieval result; and
a step of generating a language model for voice recognition from the acquired web page.

Advantageous Effects of Invention

According to the present invention, the corpus including a web page is analyzed, a word appropriate for a predetermined document type is extracted, a word set generated from the extracted word is used as a retrieval query to cause an Internet information retrieval engine to perform the retrieval, and a language model is generated based on web pages acquired from link destinations of a retrieval result. Thus, the language model can be generated by efficiently collecting the corpus similar to the content of the voice recognition target.

BRIEF DESCRIPTION OF DRAWINGS

FIG. 3 A diagram shows an example of a morphological analysis result acquired by a corpus analyzing unit according to an exemplary embodiment of the present invention;

FIG. 4 A table shows an example of a "document type" defined or selected by a document type selecting unit according to an exemplary embodiment of the present invention;

FIG. 5 A diagram shows an example of a calculation result of an appearance frequency according to an exemplary embodiment of the present invention;

FIG. 6 A diagram shows an example of a word set according to the first exemplary embodiment of the present invention;

FIG. 7 A flowchart shows an example of a word set generating process according to a second exemplary embodiment of the present invention; and FIG. 8 A diagram shows an example of a word set according to the second exemplary embodiment of the present invention.

DESCRIPTION OF EMBODIMENTS

Hereinafter, exemplary embodiments of the present invention will be described in detail with reference to the accompanying drawings.

(First Exemplary Embodiment)

Figure 1:
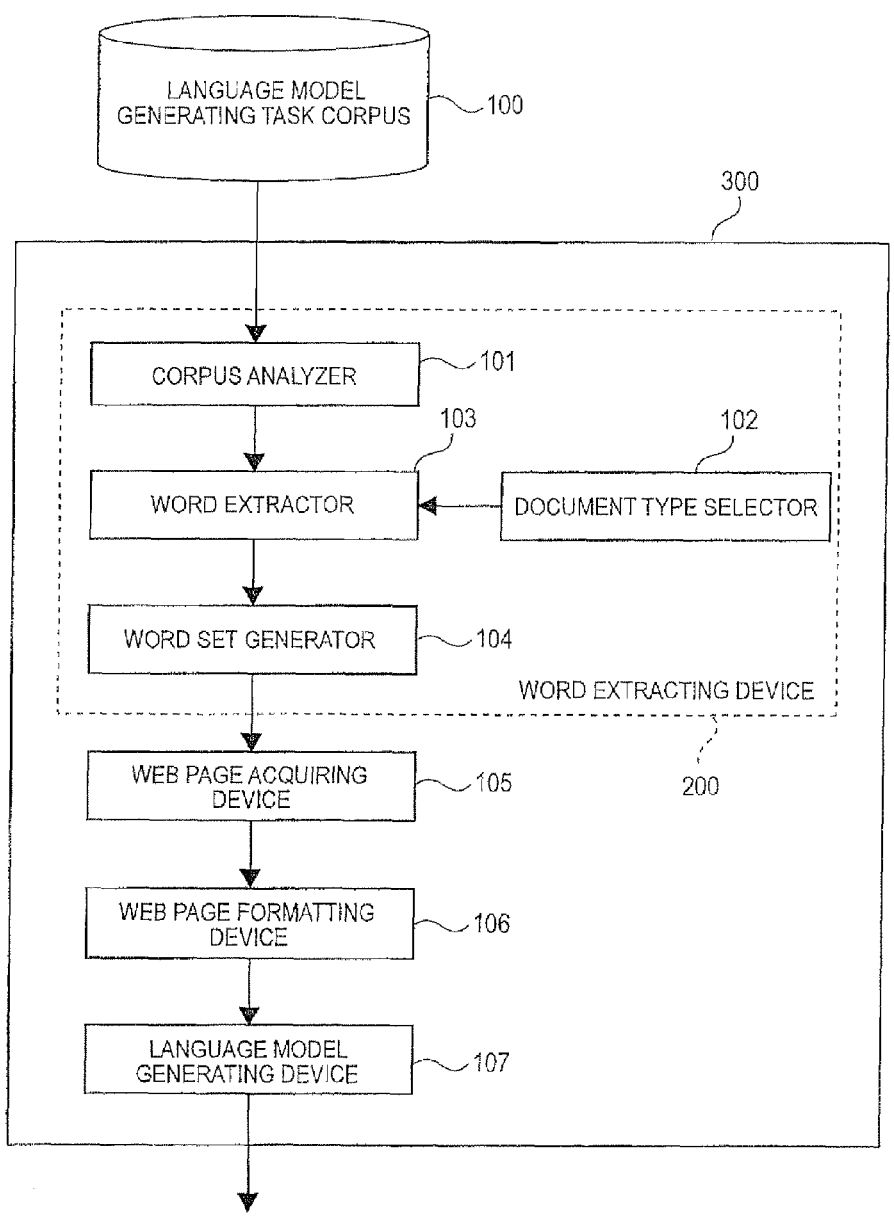
FIG. 1 A block diagram shows an example of a configuration of a language model generating system according to a first exemplary embodiment of the present invention.

FIG. 1 is a block diagram illustrating an example of a configuration of a language model generating system according to a first exemplary embodiment of the present invention.

In the language model generating system illustrated in FIG. 1, a language model generating device 300 generates a language model according to a predetermined voice recognition task based on a language model generating task corpus 100.

The language model generating task corpus 100 is a language resource including various documents (web (world wide web) pages) described in a document description language such as an HTML or an extensible markup language (XML) and used as a learning corpus of the language model generating device 300. In the present embodiment, it is assumed that the language model generating task corpus 100 includes a linguistic expression similar to a voice recognition target task.

The language model generating device 300 includes; a word extracting device 200, a web page acquiring unit 105, a web page formatting unit 106, and a language model generating unit 107. The word extracting device 200 includes; a corpus analyzing unit 101, a document type selecting unit 102, a word extracting unit 103, and a word set generating unit 104.

The corpus analyzing unit 101, of the word extracting device 200, performs an analysis process including morphological analysis of a document on the description content of each document inside the language model generating task corpus 100. For example, for the morphological analysis, an existing morphological analysis technique such as "Tree Tagger" may be used (developed at the Institute for Computational Linguistics of University of Stuttgart; http://www.ims.uni-stuttgart.de/projekte/corplex/TreTagger/DecisionTreeTagger.html). In Japanese, a Mecab system may be used (provided by a joint research between department of informatics, Kyoto University-NTT communication science laboratory, see http://mecab.sourceforge.net/) or a Chasen system (provided by a natural Language processing course of Graduate School of Information Science, Nara Institute of Science and Technology, see http://chasen-legacy.sourceforge.jp/).

For example, the morphological analysis result by the corpus analyzing unit 101 is represented as in FIG. 3 which will be described in detail later. The morphological analysis result of a text includes information of each word included in the text, such as "notation", and "part of speech" as illustrated in FIG. 3.

The document type selecting unit 102 of the word extracting device 200 sets a rule for word extraction performed by the word extracting unit 103. A "document type" according to the content or the style desired to voice-recognize is defined or selected by an operation of the document type selecting unit 102. An example of the "document type" defined by the document type selecting unit 102 is illustrated in FIG. 4 which will be described in detail later. In the example illustrated in FIG. 4, wording such as a British English word and a American English word, "part of speech" selected from a multisense word, and a colloquial document which includes spoken language used in a daily conversation are presented. These documents are examples of what is defined as the "document type". Further, in order to change the content or the style desired to voice-recognize, the definition of the document type is changed by the document type selecting unit 102.

The word extracting unit 103 of the word extracting device 200 extracts a feature word, from which a retrieval result associated with the aim of voice recognition is obtained, which is obtained from the analysis results by the corpus analyzing unit 101 according to the rule (document type) set by the document type selecting unit 102.

For example, for formal documents such as meeting minutes, the word extracting unit 103 extracts a noun and a verb such as "decease" or "increase" as the feature word rather than a pronoun such as "it" or "we", and a modal verb such as "can" or "may". Further, when the meeting minutes includes a British English word and an American English word, both of a character string including a British English word and a character string including an American English word are extracted as the feature words. In the case of daily conversation, a character string having a feature of a colloquial expression such as "right?", "Oh, yes", or "Could be" is extracted. Further, a method of selecting a word having a high appearance probability with reference to frequency information of words obtained from a huge amount of text information on a web released by Google may be used (in case of Japanese, see http://googlejapan.blogspot.com/2007/11/n-gram.HTML).

The word set generating unit 104 of the word extracting device 200 generates a combination of a plurality of words extracted by the word extracting unit 103 as a word set. For example, the word set generating unit 104 generates a combination of relevant words such as "same period", "sales", or "service" as the word set. The word set generated by the word extracting device 200 in the above described manner is used for web page acquisition by the web page acquiring unit 105.

The web page acquiring unit 105 has the function of accessing (a set of) web pages through a predetermined retrieval engine. The web page acquiring unit 105 generates a retrieval query for performing a narrowing-down retrieval on the word set generated by the word set generating unit 104, causes the retrieval engine to perform a retrieval process by the query, and acquires a retrieval result. The retrieval result includes links to web pages according to the retrieval query. The web page acquiring unit 105 acquires data of the web pages through the links.

The web page formatting unit 106 removes a symbol (for example, an angle bracket, a triangular mark, or an asterisk) or a HTML tag (for example, <br> or <head>) which is unnecessary for generation of the language model for voice recognition from the web page data acquired by the web page acquiring unit 105 and so extracts the sentence portion.

The language model generating unit 107 generates the language model using the sentence portion extracted by the web page formatting unit 106 as the corpus for generating the language model. For example, for the sake of generation of the language model for voice recognition in Japanese, there may be used an existing tool such as a Julius system (Kawahara Lab., Kyoto University, Information-technology Promotion Agency (IPA), Shikano Lab., Nara Institute of Science and Technology, and Julius project team, Nagoya Institute of Technology, http://julius.sourceforge.jp/) and an HTK system (University of Cambridge, http://htk.eng.cam.ac.uk/). The HTK system is also available in English speech recognition. The generated language model is used for various voice recognition processes.

In the first exemplary embodiment, the language model generating device 300 is constructed by hardware such as a IC or a plurality of ICs. However, all or some of functions of the language model generating device 300 may be implemented by software such that the program stored in program memory is read and executed by a processor in an information processing device (for example, a personal computer (PC)) including the processor, the program memory, and a work memory. Alternatively, all or some of functions of the language model generating device 300 may be implemented by a combination of hardware and software. Further, an input device such as a keyboard or a mouse may be connected to the document type selecting unit 102 in a wired or wireless manner, and the document type may be defined or selected according to an operation of the input device by a user.

Subsequently, a description will be made in connection with an operation of the word extracting device 200.

Figure 2:
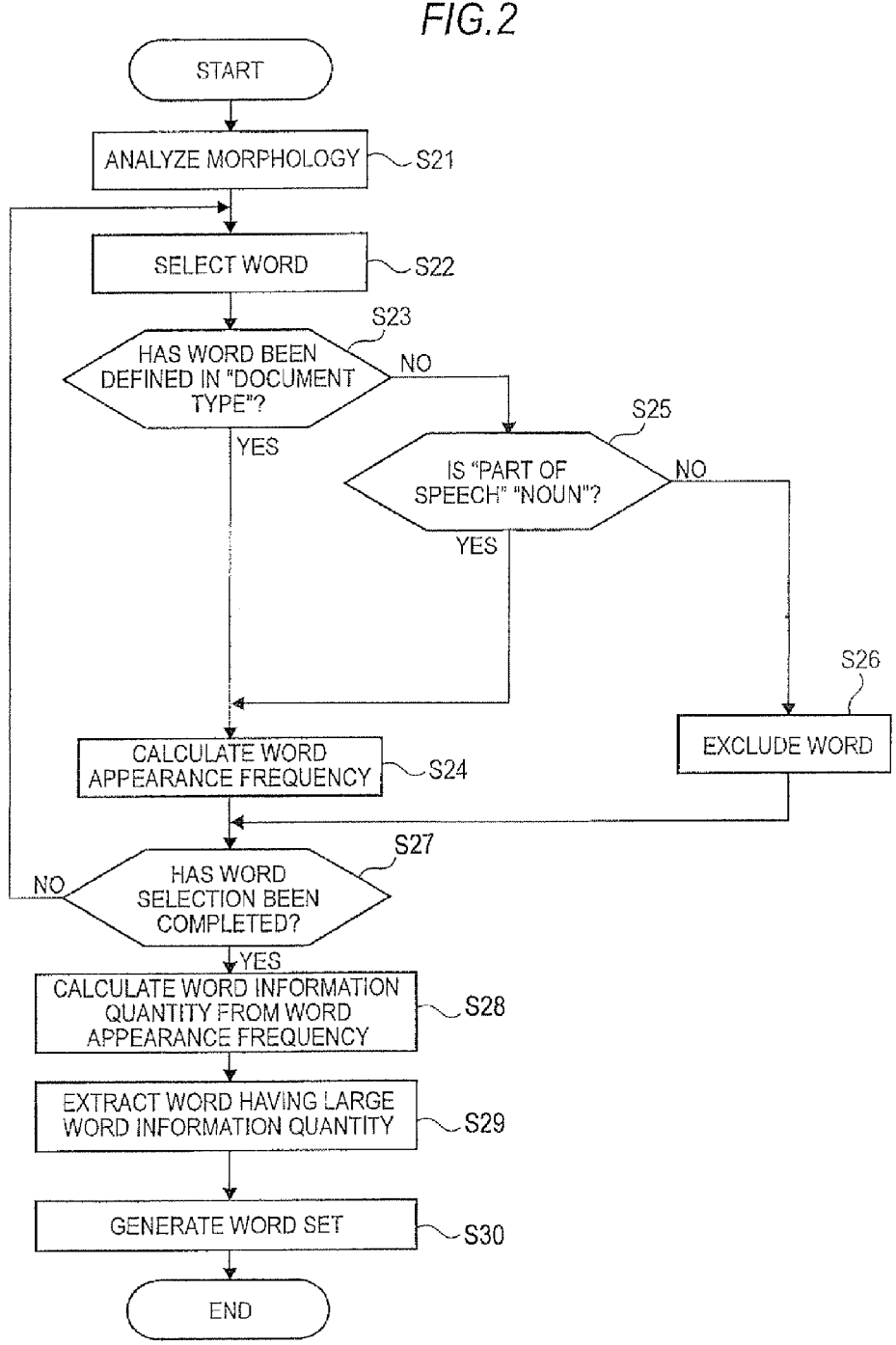
FIG. 2 A flowchart shows an example of a word set generating process according to the first exemplary embodiment of the present invention.

FIG. 2 is a flowchart illustrating an example of a word set generating process according to the first exemplary embodiment of the present invention.

In the word extracting process according to the present embodiment, in step S21, first the corpus analyzing unit 101 performs morphological analysis on the description content of the language model generating task corpus 100 and acquires a morphological analysis result. For example, the morphological analysis result includes information representing "notation (character string)", and "part of speech" of words configuring a text as illustrated in FIG. 3.

FIG. 3 is a diagram illustrating an example of a morphological analysis result acquired by the corpus analyzing unit 101 according to an exemplary embodiment of the present invention. In the example illustrated in FIG. 3, five words of "it", "is", "fine", "today", and "." are detected as the morphological analysis result of a text "It is fine today.".

Of these words, each information of notation "it", and part of speech "pronoun" is detected on the word "it". Similarly, a morphological analysis result including information of notation "is", and part of speech "verb" is detected on the word "is". Further, a morphological analysis result including information of notation "fine", and part of speech "adjective" is detected on the word "fine". A morphological analysis result including information of notation "today", and part of speech "noun" is detected on the word "today". Information of part of speech "punctuation mark" is acquired on a period ".".

In the example illustrated in FIG. 3, seven words of "it", "will", "be", "sunny", "tomorrow", "again" and "." are detected as the morphological analysis result of a text "It will be sunny tomorrow again.".

Each information of notation "it", and part of speech "pronoun" is detected on the word "it". Similarly, a morphological analysis result including information of notation "will" and part of speech "modal verb" is detected on the word "will". A morphological analysis result including information of notation "be", and part of speech "verb" is detected on the word "be". A morphological analysis result including information of notation "sunny" and part of speech "adjective" is detected on the word "sunny". A morphological analysis result including information of notation "tomorrow" and part of speech "noun" is detected on the word "tomorrow". A morphological analysis result including information of notation "again", and part of speech "adverb" is detected on the word "again". Information of part of speech "punctuation mark" is acquired on a period ".".

In step S22, the word extracting unit 103 selects one word from the morphological analysis result illustrated in FIG. 3 in a predetermined order. The word extracting unit 103 determines whether or not the selected word is to be used as a word set generation target word by a subsequent process. For example, the selection order may be based on an appearance order inside the text.

In step S23, the word extracting unit 103 determines whether or not "notation", or "notation" and "part of speech" of the selected word correspond to (match with) information of "notation", or "notation" and "part of speech" of any character string in the document type defined by the document type selecting unit 102.

FIG. 4 is a table illustrating an example of the "document type" defined or selected by the document type selecting unit 102 according to an exemplary embodiment of the present invention. In the example illustrated in FIG. 4, as notations (character strings) for defining the document type of the "wording", the five pairs of notation character strings are defined. Each of the five pairs of notation character strings consists of a British English word and an American English word. That is, "colour" and "color", "aeroplane" and "airplane", "lift" and "elevator", "flyover" and "overpass", and "fitted" and "fit" are defined.

In the example illustrated in FIG. 4, as notations (character strings) and part of speech for defining the "selected meaning" category of the document types, three notation character strings are defined. That is, "saw" as a verb, "see" as a verb, "live" as a verb, and "live" as a adjective are defined, but "saw" as a noun, "see" as a noun aren't defined. Therefore, the word extracting unit 103 doesn't extract "saw" as a noun, "see" as a noun.

Further, in the example illustrated in FIG. 4, as notations (character strings) for defining the "colloquial expression" category of document types, three notation character strings are defined. That is, "Right?", "Oh, yes"", and "Could be are define.

In step S23, the word extracting unit 103 determines whether or not "notation", or "notation" and "part of speech" of the word selected in step S22 correspond to (match with) "notation", or "notation" and "part of speech" of the character strings defined by the document type selecting unit 102.

When "notation", or "notation" and "part of speech" of the selected word correspond to "notation", or "notation" and "part of speech" of the character string set in the "document type" (Yes in step S23), in step S24, the selected word is set as the word set generating target, and the appearance frequency (the number of appearance times) of the selected word is calculated.

FIG. 5 is a diagram illustrating an example of a calculation result of the appearance frequency according to an exemplary embodiment of the present invention.

In the example illustrated in FIG. 5, the "appearance frequency" represents the number of times that the same word is selected in step S22. In this example, a numerical value "32" is given as the appearance frequency of a word having "notation" of "same period".

Similarly, "31" is obtained as the appearance frequency of "precedingyear", and "19" is obtained as the appearance frequency of "decrease". "16" is obtained as the appearance frequency of "business", and "16" is obtained as the appearance frequency of "sale" (the rest is similar to above).

Meanwhile, when "notation", or "notation" and "part of speech" of the selected word do not correspond to "notation", or "notation" and "part of speech" of the character strings set in the "document type" (No in step S23), in step S25, the word extracting unit 103 determines whether or not "part-of-speech" information of the selected word represents a noun.

When the "part-of-speech" information of the selected word does not represent a noun (No in step S25), in step S26, the corresponding word is excluded from the selection target of the word set.

However, when the "part-of-speech" information of the selected word represents a noun (Yes in step S25), in step S24, the appearance frequency of the corresponding word is calculated as illustrated in FIG. 5.

Thereafter, in step S27, the word extracting unit 103 determines whether or not the determination as to whether or not the selected word is to be used as the word set generation target has been made on all words obtained as the morphological analysis result. When a non-selected word still remains (No in step S27), the process returns to step S22. Another word is selected, and the subsequent process is repeated.

Meanwhile, when the word extracting unit 103 has completed the selection on all words obtained as the morphological analysis result (Yes in step S27), in step S28, the word set generating unit 104 calculates a word information quantity Ix of each word based on the appearance frequency calculated in step S24 according to Formula I.

$$I_x = \frac{T_x}{\sum_{x=t} T_x} \times 100 \qquad \{\text{Formula 1}\}$$

Here, the calculation of the word information quantity Ix in step S28 is performed on each word that has not been excluded in step S26.

In Formula I, Tx represents the power of the appearance frequency of each word. A word having a large word information quantity Ix value represents the feature of the language model generating task corpus 100, that is, it is recognized as a word having large similarity to the language model generating task corpus 100.

In step S29, the word set generating unit 104 extracts a predetermined number of words having the word information quantity Ix value larger than a predetermined threshold value. The words may be extracted in the descending order of the word information quantity Ix, or a predetermined number of words may be randomly selected.

In step S30, the word set generating unit 104 generates a word set based on the extracted words as illustrated in FIG. 6.

FIG. 6 is a diagram illustrating an example of a word set according to the first exemplary embodiment of the present invention.

In the example illustrated in FIG. 6, a combination of five words of "business performance", "preceding year", "same period", "field", and "sales" is generated as the word set. The five words are high in the appearance frequency as illustrated in FIG. 5 and recognized as expressly representing the feature of the language model generating task corpus.

The word extracting device 200 performs the above described word set generating process and then transmits the generated word set to the web page acquiring unit 105.

As described above, the web page acquiring unit 105 inputs the word set to the retrieval engine as the retrieval query and obtains the retrieval result relevant to the word set. The web page formatting unit 106 removes any symbols or HTML tags from the web pages acquired by the web page acquiring unit 105 and extracts the sentence portion. The language model generating unit 107 generates the language model using the sentence portion extracted by the web page formatting unit 106 as the language model generating corpus for voice recognition.

As described above, according to the language model generating system according to the present embodiment, the narrowing-down retrieval is performed using words obtained by the word extracting device 200, and thus the retrieval result list of web pages including linguistic expressions having high similarity or high relevance to the voice recognition target task can be displayed in the upper ranks of the retrieval result. The web page data is acquired using links from the retrieval result list page, and thus the high-accuracy language model generation corpus can be obtained.

Next, a description will be made in connection with a language model generating system according to another exemplary embodiment of the present invention. In the following exemplary embodiment, parts corresponding to the first exemplary embodiment are denoted by corresponding reference numerals, and a detailed description will not be repeated.

(Second Exemplary Embodiment)

A language model generating system according to a second exemplary embodiment of the present invention has the same configuration as in the first exemplary embodiment illustrated in FIG. 1, and thus redundant descriptions will not be repeated.

In the word set generating process according to the first exemplary embodiment, the word set combination of five words is generated as one set as an example. In the present embodiment, the number of words in the word set and the number of sets to generate are adjusted according to a sentence quantity or the content of the language model generating task corpus 100, so that the web page is more efficiently selected.

FIG. 7 is a flowchart illustrating an example of a word set generating process according to the second exemplary embodiment of the present invention.

In a word extracting process according to the present embodiment, in step S71, first the corpus analyzing unit 101 performs morphological analysis on the description content of the language model generating task corpus 100 and acquires a morphological analysis result. For example, the morphological analysis result includes information representing "notation (character string)", and "part of speech" of words configuring a text as illustrated in FIG. 3, similarly to the first exemplary embodiment.

In step S72, the word extracting unit 103 selects a word from the morphological analysis result illustrated in FIG. 3 in a predetermined order. The word extracting unit 103 determines whether or not the selected word is to be used as a word set generation target word by a subsequent process. For example, the selection order may be based on an appearance order inside the text.

In step S73, the word extracting unit 103 determines whether or not "notation", or "notation" and "part of speech" of the selected word correspond to (match with) information of "notation", or "notation" and "part of speech" of any character string in the document type defined by the document type selecting unit 102. The definition of the document type by the document type selecting unit 102 may be made, for example, as illustrated in FIG. 4, similarly to the first exemplary embodiment.

In step S73, the word extracting unit 103 determines whether or not "notation", or "notation" and "part of speech" of the word selected in step S72 correspond to "notation", or "notation" and "part of speech" of the character strings defined by the document type selecting unit 102.

When "notation", or "notation" and "part of speech" of the selected word correspond to "notation", or "notation" and "part of speech" of the character string set in the "document type" (Yes in step S73), in step S74, the selected word is set as the word set generating target, and the appearance frequency (the number of appearance times) of the selected word is calculated. An example of the appearance frequency of each word is illustrated in FIG. 5, similarly to the first exemplary embodiment.

Meanwhile, when "notation", or "notation" and "part of speech" of the selected word do not correspond to "notation", or "notation" and "part of speech" of the character string set in the "document type" (No in step S73), in step S75, the word extracting unit 103 determines whether or not the "part-of-speech" information of the selected word represents a noun.

When the "part-of-speech" information of the selected word does not represent a noun (No in step S75), in step S76, the corresponding word is excluded from the selection target of the word set.

However, when the "part-of-speech" information of the selected word represents a noun (Yes in step S75), in step S74, the appearance frequency of the corresponding word is calculated as illustrated in FIG. 5.

Thereafter, in step S77, the word extracting unit 103 determines whether or not the determination as to whether or not the selected word is to be used as the word set generation target has been made on all words obtained as the morphological analysis result. When a non-selected word still remains (No in step S77), the process returns to step S72. Another word is selected, and the subsequent process is repeated.

Meanwhile, when the word extracting unit 103 has completed the selection on all words obtained as the morphological analysis result (Yes in step S77), in step S78, the word set generating unit 104 calculates a word information quantity Ix of each word based on the appearance frequency calculated in step S24 according to Formula I, similarly to the first exemplary embodiment.

In step S79, the word set generating unit 104 extracts a predetermined number of words having a word information quantity Ix value larger than a predetermined threshold value. The words may be extracted in descending order of the word information quantity Ix, or a predetermined number of words may be randomly selected.

In step S80, the word set generating unit 104 generates m word sets each of which has n words from the extracted words.

Values of the variables m and n may be set by the user through the input device connected to the word extracting device 200, or the values of the variables m and n may be set based on the analysis result of the sentence quantity of the language model generating task corpus 100 by the corpus analyzing unit 101.

For example, when the sentence quantity of the language model generating corpus 100 is small, since the number of words extracted in step S80 decreases, a narrowing-down retrieval range gets narrow. Thus, it is difficult to acquire web pages similar to the voice recognition target, and a degree of accuracy of voice recognition is not improved. In this case, for example, five word sets each of which has three words are generated as illustrated in FIG. 8 so that a variation can be given to the retrieval. As a result, the narrowing-down retrieval range can get broaden.

FIG. 8 is a diagram illustrating an example of a word set according to the second exemplary embodiment of the present invention.

In the example illustrated in FIG. 8, the combination of three words "business performance", "preceding year", and "service" is generated as word set 1. Further, word set 2 includes three words "field", "business performance", and "sales", and word set 3 includes three words "quarter", "sales", and "business performance". Further, word set 4 includes three words "service", "sales", and "business performance", and word set 5 includes three words "quarter", "service", and "investment". For example, the words included in the word sets 1 to 5 are randomly selected from among words having the large word information quantity extracted in step S80. Alternatively, the user may designate a selection method in advance.

As a result, the narrowing-down retrieval range can be broadened, and web pages causing an improved degree of accuracy of voice recognition can be acquired.

The word extracting device 200 performs the above described word set generating process and then transmits the generated word set to the web page acquiring unit 105.

As described above, the web page acquiring unit 105 inputs the word set to the retrieval engine as the retrieval query and obtains the retrieval result relevant to the word set. The web page formatting unit 106 removes any symbols or HTML tags from the web pages acquired by the web page acquiring unit 105 and extracts the sentence portion. The language model generating unit 107 generates the language model using the sentence portion extracted by the web page formatting unit 106 as the language model generating corpus for voice recognition.

As described above, according to the language model generating system according to the present embodiment, the narrowing-down retrieval is performed using a plurality of word sets obtained by the word extracting device 200. Thus, even when the sentence quantity included in the language model generating task corpus 100 is small, the high-accuracy language model generation corpus can be obtained.

That is, according to the language model generating system according to the present embodiment, an appropriate word can be extracted even from a small amount of language model generating task corpus 100, and a language corpus similar to the language model generating task corpus 100 and including the content of the voice recognition target can be efficiently collected from web pages on the Internet.

According to the exemplary embodiments of the present invention, information necessary for generating the language model in the voice recognition technique can be efficiently collected sufficiently from the Internet, and the language model having a high degree of accuracy of voice recognition can be generated.

According to the exemplary embodiments of the present invention, the language model similar to the target task or the language model capable of supporting even the utterance style such as the regional dialect can be efficiently generated only by preparing a small amount of corpus data including the content desired to voice-recognize. Further, the cost for preparing a large amount of data necessary for generating the high-accuracy language model can be reduced.

In the exemplary embodiments of the present invention, the word information quantity Ix representing the feature of the sentence is calculated, and the feature word in each text is extracted based on the word information quantity Ix. Further, the word representing the feature of the sentence desired to voice-recognize is preferentially extracted, and then the language model is generated. Thus, the high-accuracy language model can be generated.

Further, in the word set generating process, as for the word that is not defined in the document type, a noun having the same meaning of the word is extracted. Thus, disambiguation can be made at the time of web retrieval, and the desired information can be efficiently acquired.

The word extracting device 200 and the language model generating device 300 according to the exemplary embodiments of the present invention are implemented by hardware. However, the functions of the word extracting device 200 and the language model generating device 300 according to the exemplary embodiments of the present invention may be implemented such that a program causing a computer to function as the word extracting device 200 and the language model generating device 300 is stored in a computer-readable storage medium such as a hard disc device, semiconductor memory or the like, and the program is read and executed by the computer.

By implementing the word extracting device 200 according to the exemplary embodiments of the present invention by hardware and combining the word extracting device 200 with an existing language model generating means, a function equivalent to the language model generating device 300 may be provided.

In the above embodiments, the language model generating task corpus 100 is defined as a set of web documents, but the content of the corpus is not limited thereto.

The above embodiments are exemplary embodiments of the present invention. However, the scope of the present invention is not limited to the above embodiments, and various modifications can be made within the scope not departing from the gist of the present invention. For example, the present invention can apply to Spanish, Chinese or the like.

All or some of the above exemplary embodiments can be described as in the following notes, but the present invention is not limited to the following supplementary notes.

(Supplementary note 1) A language model generating device, comprising:

a corpus analyzer which analyzes text in a corpus including a set of world wide web (web) pages;

an extractor which extracts at least one word appropriate for a document type set according to a voice recognition target based on an analysis result by the corpus analyzer;

a word set generator which generates a word set from the at least one word extracted by the extractor;

a web page acquiring device which causes a retrieval engine to perform a retrieval process using the word set generated by the word set generator as a retrieval query of the retrieval engine on the Internet and acquires a web page related to the word set from the retrieval result; and a language model generating device which generates a language model for voice recognition from the web page.

(Supplementary note 2) The language model generating device according to Supplementary note 1, further comprising a selector which sets a character string defining the document type, wherein the extractor compares each word obtained from the analysis result with the character string and extracts the word when the word corresponds to the character string.

(Supplementary note 3) The language model generating device according to Supplementary note 2, wherein the character string includes information of notation and a part of speech of the character string, the corpus analyzer performs morphological analysis of the text in the corpus and detects information of notation and a part of speech for each word in the text, and the extracting unit compares the notation, or the notation and part of speech of each word in the text with the notation, or the notation and part of speech of the character string and extracts a word corresponding to the notation, or the notation and part of speech of the character string.

(Supplementary note 4) The language model generating device according to Supplementary note 3, wherein the extractor determines whether or not a part of speech of a word not corresponding to the character string is a noun and excludes the word from an extraction target when the part of speech of the word is not the noun.

(Supplementary note 5) The language model generating device according to any one of Supplementary notes 1 to 4, wherein the word set generator calculates a word information quantity, representing similarity to the corpus on each word extracted by the extractor and generates the word set from a word whose word information quantity value is at the predetermined value or more.

(Supplementary note 6) The language model generating device according to any one of Supplementary notes 1 to 5, wherein the word set generator generates a predetermined number of word sets each of which includes a predetermined number of words from words extracted by the extractor.

(Supplementary note 7) The language model generating device according to any one of Supplementary notes 1 to 6, wherein the word set generator calculates a word information quantity, representing similarity to the corpus on each word extracted by the extractor and generates the predetermined number of word sets each of which includes the predetermined number of words randomly from words whose word information quantity value is at a predetermined value or more.

(Supplementary note 8) A language model generating method, comprising the steps of:

analyzing a text in a corpus including a set of world wide web (web)) pages;

extracting at least one word appropriate for a document type set according to a voice recognition target based on an analysis result;

generating a word set from at least one extracted word;

causing a retrieval engine to perform a retrieval process using the generated word set as a retrieval query of the retrieval engine on the Internet and acquiring a web page related to the word set from the retrieval result; and generating a language model for voice recognition from the acquired web page.

(Supplementary note 9) The language model generating method according to Supplementary note 8, further comprising a step of setting a character string defining the document type, wherein the at least one word is extracted such that each word obtained from the analysis result is compared with the character string, and the word is extracted when the word corresponds to the character string.

(Supplementary note 10) The language model generating method according to Supplementary note 9, wherein the character string includes information of notation and a part of speech of the character string, the corpus is analyzed such that morphological analysis of the text in the corpus is performed, and information of notation and a part of speech is detected for each word in the text, and the at least one word is extracted such that the notation, or the notation and part of speech of each word in the text are compared with the notation, or the notation and part of speech of the character string, and a word corresponding to the notation, or the notation and part of speech of the character string is extracted.

(Supplementary note 11) The language model generating method according to Supplementary note 10, wherein the at least one word is extracted such that it is determined whether or not a part of speech of a word not corresponding to the character string is a noun, and the word is excluded from an extraction target when the part of speech of the word is not the noun.

(Supplementary note 12) The language model generating method according to any one of Supplementary notes 8 to 11, wherein the word set is generated such that a word information quantity representing similarity to the corpus is calculated on each extracted word, and the word set is generated from a word whose word information quantity value is a predetermined value or more.

(Supplementary note 13) The language model generating method according to any one of Supplementary notes 8 to 12, wherein the word set is generated such that a predetermined number of word sets each of which includes a predetermined number of words are generated from extracted words.

(Supplementary note 14) The language model generating method according to any one of Supplementary notes 8 to 13, wherein the word set is generated such that a word information quantity representing similarity to the corpus is calculated on each extracted word, and the predetermined number of word sets each of which includes the predetermined number of words are generated randomly from words whose word information quantity value is at a predetermined value or more.

(Supplementary note 15) A non-transitory computer-readable recording medium storing a language model generating program used in a computer of a language model generating device and causing the computer to execute:

a step of analyzing a text in a corpus including a set of world wide web (web) pages;

a step of extracting at least one word appropriate for a document type set according to a voice recognition target based on an analysis result;

a step of generating a word set from at least one extracted word;

a step of causing a retrieval engine to perform a retrieval process using the generated word set as a retrieval query of the retrieval engine on the Internet and acquiring a web page related to the word set from the retrieval result; and a step of generating a language model for voice recognition from the acquired web page.

(Supplementary note 16) The non-transitory computer-readable recording medium according to Supplementary note 15, the program further causing the computer to execute a step of setting a character string defining the document type, wherein in the step of extracting the at least one word, each word obtained from the analysis result is compared with the character string, and the word is extracted when the word corresponds to the character string.

(Supplementary note 17) The non-transitory computer-readable recording medium according to Supplementary note 16, wherein the character string includes the information of notation and a part of speech of the character string, in the step of analyzing the text in the corpus, morphological analysis of the text in the corpus is performed, and information of notation and a part of speech is detected for each word in the text, and in the step of extracting the at least one word, the notation, or the notation and part of speech of each word in the text are compared with the notation, or the notation and part of speech of the character string, and a word corresponding the notation, or the notation and part of speech of the character string is extracted.

(Supplementary note 18) The non-transitory computer-readable recording medium according to Supplementary note 17, wherein in the step of extracting the at least one word, it is determined whether or not a part of speech of a word not corresponding to the character string is a noun, and the word is excluded from an extraction target when the part of speech of the word is not a noun.

(Supplementary Note 19) The non-transitory computer-readable recording medium according to any one of Supplementary notes 15 to 18, wherein in the step of generating the word set, a word information quantity representing similarity to the corpus is calculated on each extracted word, and the word set is generated from a word whose word information quantity value is at a predetermined value or more.

(Supplementary note 20) The non-transitory computer-readable recording medium according to any one of Supplementary notes 15 to 19, wherein in the step of generating the word set, a predetermined number of word sets each of which includes a predetermined number of words are generated from extracted words.

(Supplementary note 21) The non-transitory computer-readable recording medium according to any one of Supplementary notes 15 to 20, wherein in the step of generating the word set, a word information quantity representing similarity to the corpus is calculated on each extracted word, and the predetermined number of word sets each of which includes the predetermined number of words are generated randomly from words whose word information quantity value is at a predetermined value or more.

What is claimed is:

1. A language model generating device implemented by hardware, comprising:

a corpus analyzer which analyzes text in a corpus including a set of world wide web (web) pages;

an extractor which extracts at least one word appropriate for a document type set according to a voice recognition target based on an analysis result by the corpus analyzer;

a word set generator which generates at least one word set from the at least one word extracted by the extractor;

a hardware-implemented web page acquiring device which causes a retrieval engine to perform a retrieval process using the word set generated by the word set generator as a retrieval query of the retrieval engine on the Internet and acquires a web page related to the word set from the retrieval result; and a language model generator which generates a language model for voice recognition from the web page, wherein the word set generator calculates a word information quantity, representing similarity to the corpus on each word extracted by the extractor and generates the at least one word set from at least one word whose word information quantity is greater than or equal to the predetermined value, the word information quantity being represented by $I_x$, where $T_x$ represents a power of an appearance frequency of each word and $I_x$ is defined as follows:

$$I_x = \frac{T_x}{\sum_{x=1} T_x} \times 100,$$

wherein at least one of the analyzing, extracting, generating, and retrieving is performed by a processor.

2. The language model generating device according to claim 1, wherein the word set generator generates the predetermined number of word sets, each of which includes the predetermined number of words, are generated randomly from words whose word information quantity values are respectively greater than or equal to a predetermined value.

3. A language model generating method, comprising:

analyzing a text in a corpus including a set of world wide web (web) pages;

extracting at least one word appropriate for a document type set according to a voice recognition target based on an analysis result;

generating at least one word set from the at least one extracted word;

causing a retrieval engine to perform a retrieval process using the generated word set as a retrieval query of the retrieval engine on the Internet and acquiring a web page related to the word set from the retrieval result; and generating a language model for voice recognition from the acquired web page, wherein the at least one word set is generated such that a word information quantity representing similarity to the corpus is calculated on each extracted word, and the at least one word set is generated from at least one word whose word information quantity is greater than or equal to a predetermined value, the word information quantity being represented by $I_x$, where $T_x$ represents a power of an appearance frequency of each word and $I_x$ is defined as follows:

$$I_x = \frac{T_x}{\sum_{x=t} T_x} \times 100.$$

4. The language model generating method according to claim 3,
wherein the word set is generated such that the predetermined number of word sets, each of which includes the predetermined number of words, are generated randomly from words whose word information quantity values are respectively greater than or equal to a predetermined value.

5. A non-transitory computer-readable recording medium storing a language model generating program used in a computer of a language model generating device and causing the computer to execute a method comprising:
  analyzing a text in a corpus including a set of world wide web (web) pages;
  extracting at least one word appropriate for a document type set according to a voice recognition target based on an analysis result;
  generating at least one word set from at least one extracted word;
  causing a retrieval engine to perform a retrieval process using the generated word set as a retrieval query of the retrieval engine on the Internet and acquiring a web page related to the word set from the retrieval result; and
  generating a language model for voice recognition from the acquired web page,
  wherein in the step of generating the at least one word set, a word information quantity representing similarity to the corpus is calculated on each extracted word, and the at least one word set is generated from at least one word whose word information quantity is greater than or equal to a predetermined value, the word information quantity being represented by $I_x$, where $T_x$ represents a power of an appearance frequency of each word and $I_x$ is defined as follows:

$$I_x = \frac{T_x}{\sum_{x=t} T_x} \times 100.$$

6. A non-transitory computer-readable recording medium according to claim 5,
wherein the word set is generated such that the predetermined number of word sets, each of which includes the predetermined number of words, are generated randomly from words whose word information quantity values are respectively greater than or equal to a predetermined value.

* * * * *